US008583042B2

(12) United States Patent
Cutrignelli (10) Patent No.: US 8,583,042 B2
(45) Date of Patent: Nov. 12, 2013

(54) CHANNEL RANDOMIZATION FOR BACKOFF EFFICIENCY IMPROVEMENT

(75) Inventor: Luca Cutrignelli, Bryssels (BE)

(73) Assignee: ST-Ericsson SA, Plan-les-Ouates (CH)

( * ) Notice: Subject to any disclaimer, the term of this patent is extended or adjusted under 35 U.S.C. 154(b) by 104 days.

(21) Appl. No.: 13/079,352

(22) Filed: Apr. 4, 2011

(65) Prior Publication Data
US 2012/0083210 A1   Apr. 5, 2012

Related U.S. Application Data

(60) Provisional application No. 61/388,225, filed on Sep. 30, 2010.

(51) Int. Cl.
*H04B 7/00* (2006.01)
*H04B 1/00* (2006.01)
*H04W 4/00* (2009.01)
*H04J 3/06* (2006.01)

(52) U.S. Cl.
USPC .......... 455/41.2; 375/137; 375/145; 370/329; 370/515

(58) Field of Classification Search
USPC ............. 455/41.2, 44, 515, 103, 91; 375/137, 375/145, 242, 354, 367; 370/322, 329, 431, 370/464, 515
See application file for complete search history.

(56) References Cited

U.S. PATENT DOCUMENTS

| | | | | |
|---|---|---|---|---|
| 3,659,046 A | * | 4/1972 | Angeleri et al. | 380/43 |
| 4,183,088 A | * | 1/1980 | Simmons | 708/250 |
| 5,408,506 A | * | 4/1995 | Mincher et al. | 375/134 |
| 5,511,099 A | * | 4/1996 | Ko et al. | 375/368 |
| 5,995,533 A | * | 11/1999 | Hassan et al. | 375/140 |
| 6,112,094 A | * | 8/2000 | Dent | 455/452.1 |
| 6,412,022 B1 | * | 6/2002 | Kumpf et al. | 710/1 |
| 6,718,395 B1 | | 4/2004 | Ziegler | |
| 7,079,568 B1 | * | 7/2006 | Boetzel et al. | 375/132 |
| 7,231,221 B2 | | 6/2007 | Assarsson et al. | |
| 2003/0063655 A1 | * | 4/2003 | Young | 375/132 |
| 2006/0062115 A1 | * | 3/2006 | Nagai et al. | 369/47.19 |
| 2006/0189321 A1 | | 8/2006 | Oh et al. | |
| 2008/0227475 A1 | | 9/2008 | Suemitsu et al. | |
| 2009/0257396 A1 | | 10/2009 | Eliezer et al. | |
| 2010/0002582 A1 | * | 1/2010 | Luft et al. | 370/230.1 |
| 2010/0027712 A1 | * | 2/2010 | Poulton | 375/295 |

FOREIGN PATENT DOCUMENTS

| | | | |
|---|---|---|---|
| EP | 1233583 | * | 8/2002 |
| EP | 2144394 A2 | | 1/2010 |
| EP | 2180757 A1 | | 4/2010 |

OTHER PUBLICATIONS

Bluetooth Special Interest Group, Bluetooth Specification ver. 4.0, Jun. 30, 2010.
EPO, Int'l Search Report in PCT/EP2011/067189, Jan. 27, 2012.
EPO, Written Opinion in PCT/EP2011/067189, Jan. 27, 2012.

* cited by examiner

*Primary Examiner* — Andrew Wendell (74) *Attorney, Agent, or Firm* — Potomac Patent Group PLLC (57) ABSTRACT

Methods and apparatus for solving problems caused by back-off procedures like that specified in the BLUETOOTH Link Layer Specification, by introducing selected randomizations of communication channels used for communication by scanning devices.

8 Claims, 6 Drawing Sheets

FIG. 1

*Scanner 1 scanning Channels*

| 1 | 2 | 3 | 1 | 2 | 3 | 1 | 2 | 3 | 1 | 2 | 3 | 1 | 2 | 3 | 1 | 2 | 3 | 1 | 2 | 3 |

*Scanner 2 scanning Channels*

| 1 | 2 | 3 | 1 | 2 | 3 | 1 | 2 | 3 | 1 | 2 | 3 | 1 | 2 | 3 | 1 | 2 | 3 | 1 | 2 | 3 | time →

FIG. 2

*Scanner 1 scanning Channels with full randomization of channels*

| 2 | 2 | 1 | 1 | 1 | 1 | 2 | 1 | 2 | 3 | 3 | 3 | 1 | 2 | 2 | 2 | 3 | 3 |

*Scanner 2 scanning Channels with full randomization of channels*

| 3 | 1 | 3 | 1 | 1 | 1 | 1 | 3 | 3 | 2 | 3 | 2 | 3 | 2 | 1 | 3 | 3 | 1 | time →

Scanner 1 scanning Channels with 3-size-block randomization

Scanner 2 scanning Channels with 3-size-block randomization time

FIG. 6

Scanner 1 scanning Channels in case Patent idea is implemented

Scanner 2 scanning Channels in case Patent idea is implemented time

CHANNEL RANDOMIZATION FOR BACKOFF EFFICIENCY IMPROVEMENT

This application claims the benefit of the filing date of U.S. Provisional Patent Application No. 61/388,225 filed on Sep. 30, 2010, which is incorporated here by reference.

BACKGROUND

This invention relates to wireless communication systems, and in particular to Wireless Personal Area Network (WPAN) and BLUETOOTH communication systems.

BLUETOOTH communication systems provide pervasive connectivity, especially between portable devices like mobile phones, laptop computers, personal digital assistants (PDAs), and other nomadic devices. A BLUETOOTH system, or piconet, typically uses frequency hopping (FH), with an air interface between devices that is organized as a succession of time slots that can include data packets. As long as the system devices hop in synchrony and with the same phase, they simultaneously use the same channel and thus stay in contact with each other. BLUETOOTH communication systems are currently specified by Version 4.0 of the Bluetooth Specification (30 Jun. 2010), which is promulgated by the Bluetooth Special Interest Group and can be found at www.bluetooth.com.

Devices operating in a low-energy mode defined by the Specification use frequency division multiple access (FDMA) and time division multiple access (TDMA), with three of forty FDMA physical channels allocated as advertising channels. A TDMA-based polling scheme is used in which one device transmits a data packet at a predetermined time and a corresponding device responds with a packet after a predetermined interval. Devices that transmit advertising packets on the advertising channels can be called Advertisers, and devices that receive advertising on the advertising channels without intending to connect to the Advertiser can be called Scanners. At the start of an advertising event, the Advertiser transmits an advertising packet corresponding to an advertising event type. Depending on the type, a Scanner can transmit a request to the Advertiser on the same advertising channel, and the Advertiser can reply with a response on the same advertising channel. Advertising is described in, for example, Volume 1, Part A, Subsection 4.2.2.2 of the Bluetooth Specification.

An active scanning procedure includes as well a point-to-point interaction between an Advertiser and Scanners in the form of Scan Request packets transmitted by the Scanners to the Advertiser and Scan Response packets transmitted by the Advertiser to the Scanners. Active scanning and other aspects of the advertising state are described in Volume 6, Parts B and D, of the Bluetooth Specification. Part B is a Link Layer Specification for the low energy mode of operation.

Active scanning can be simultaneously executed by two (or more) Scanners with the same scanning settings, and so a backoff procedure that minimizes collisions between Scan Requests is required by Subsections 4.4.3 and 4.4.3.2 of the Link Layer Specification. The backoff procedure is used at the Scanner side when missing Scan Responses from an Advertiser reveal that collisions have occurred between Scan Requests of two or more Scanners. The backoff procedure uses two parameters, backoffCount and upperLimit, to restrict the number of colliding Scan Request packets. After success or failure of receiving a Scan Response to a Scan Request, the backoffCount parameter is set to a new random integer between one and the upperLimit parameter. Scan Requests can be sent only when the backoffCount parameter becomes zero, which can cause problems for some Scanners.

Some approaches to problems in signal collision avoidance are known, but those approaches do not solve the problems in the backoff procedure described above, such as prevention of bidirectional communication by a randomly determined Scanner.

For example, U.S. Patent Application Publication No. US 2009/0257396 A1 by Eliezer et al. for "System and Method of Adaptive Frequency Hopping with Look Ahead Interference Prediction" discloses dynamic adaptation of frequency hopping sequences in a BLUETOOTH system so that frequencies that regularly experience collisions during a specific time slot are replaced. A mechanism for predicting and avoiding collisions between a BLUETOOTH device and non-BLUETOOTH systems using a fixed frequency range within the BLUETOOTH frequency range are described.

European Publication EP 1233583 B1 by Schmidt et al. for "Method and Arrangement for Providing a Response to an Inquiry in a Wireless Bluetooth System" describes inquiry messaging, and an improvement to the behavior of slave devices in BLUETOOTH inquiry scenarios, so as to minimize the inquiry time that a master device spends in detecting slave devices.

SUMMARY

This application describes methods and apparatus for solving problems caused by backoff procedures like that specified in the BLUETOOTH Link Layer Specification, by introducing selected randomizations of channels used for communication by scanning devices.

In an aspect of this invention, there is provided a terminal for a communication system. The terminal includes a transmitter configured to send scan request messages through a plurality of communication channels according to a respective channel sequence that specifies a succession of time intervals and a respective communication channel to be used during each interval. The plurality of communication channels of the channel sequence are randomized with respect to the intervals that are respective to the terminal.

In an aspect of the invention, there is provided a method of generating a randomized channel sequence for a transmitter. The method includes identifying a plurality of communication channels to be used in the sequence, wherein the sequence includes a succession of intervals with each interval having a respective communication channel to be used during the interval; and randomizing the channels to be used in the channel sequence by: (a) randomly or pseudo-randomly independently determining the respective communication channel to be used in each interval; or (b) dividing the succession of intervals into successive blocks that each include a plurality of successive intervals and randomly or pseudo-randomly determining the channels to be used in each block, with each channel in a block to be used only once in that block and each block independent of the other blocks; or (c) dividing the succession of intervals into successive blocks that each include a plurality of successive intervals and randomly or pseudo-randomly determining the channels to be used in each block, with each channel in a block to be used only once in that block and with different channels to be used in adjacent intervals in adjacent blocks.

Also in an aspect of this invention, there is provided a computer-readable medium having stored instructions that, when executed by a computer, cause the computer to carry out a method of generating a randomized channel sequence for a transmitter. The method includes identifying a plurality of communication channels to be used in the sequence, wherein the sequence includes a succession of intervals with each interval having a respective communication channel to be used during the interval; and randomizing the channels to be used in the channel sequence by: (a) randomly or pseudo-randomly independently determining the respective communication channel to be used in each interval; or (b) dividing the succession of intervals into successive blocks that each include a plurality of successive intervals and randomly or pseudo-randomly determining the channels to be used in each block, with each channel in a block to be used only once in that block and each block independent of the other blocks; or (c) dividing the succession of intervals into successive blocks that each include a plurality of successive intervals and randomly or pseudo-randomly determining the channels to be used in each block, with each channel in a block to be used only once in that block and with different channels to be used in adjacent intervals in adjacent blocks.

BRIEF DESCRIPTION OF THE DRAWINGS

The various features, objects, and advantages of this invention will become apparent by reading this description in conjunction with the drawings, in which.

DETAILED DESCRIPTION

The conventional backoff procedure specified by the current BLUETOOTH Link Layer Specification has problems when multiple Scanners are active with the same scanning parameters, such as the channel sequence. In that case, the conventional backoff procedure prevents some Scanners from successfully sending any Scan Request packets, and thus from successfully receiving any Scan Response packets from an Advertiser, while other Scanners can successfully send Scan Requests and receive Scan Responses. Which particular Scanner is prevented is randomly determined, as a consequence of the conventional backoff procedure.

Figure 1:
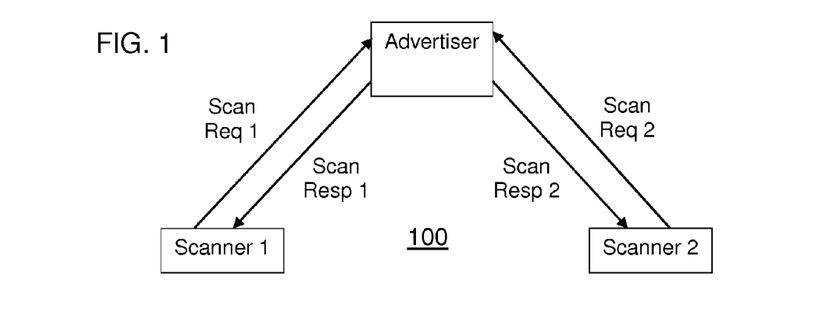
FIG. 1 depicts an exemplary communication network.

FIG. 1 depicts an exemplary communication network 100 such as a BLUETOOTH network in which an Advertiser is configured for undirected advertising (i.e., connectable undirected or scannable undirected) and a Scanner 1 and a Scanner 2 are configured for active scanning. In the undirected-advertising state, the Advertiser broadcasts information that is to be received by the two Scanners. The Scanners 1, 2 answer the Advertiser's undirected-advertising packets with respective Scan Requests 1, 2 that are transmitted on the same channel as that on which the Advertiser's packets were received. The Advertiser answers the Scan Requests 1, 2 with respective Scan Responses 1, 2. It will be appreciated that more than two Scanners can be included in the network 100.

In the scenario illustrated by FIG. 1, Scan Request 1 can "collide" with Scan Request 2 at the Advertiser, which is to say, the Scan Requests, which are transmitted on the same channel in undirected advertising, can arrive at the same or substantially the same time. As a result of such a collision, the Advertiser may not effectively receive either Scan Request and so the Advertiser may not answer with either Scan Response. As a Scan Response brings information from the Advertiser to the Scanner, having a situation in which a Scanner cannot receive any Scan Responses compromises communication between the devices.

Thus, to avoid repeated collision of Scan Requests, the Scanners are required to implement a backoff procedure, but as described above, a backoff procedure such as that currently specified by the Link Layer Specification has problems when multiple Scanners are active with the same scanning parameters. In general, the scanning parameters in a BLUETOOTH system include LE_Scan_Type, e.g., Active; LE_Scan_Interval, which is the time interval between the starts of scanning on two successive scanning channels; LE_Scan_Window, which is the window actually used within the Scanning Interval; Own_Address_Type; and Scanning_Filter_Policy. The latter two parameters are not relevant to this application. The LE_Scan_Window can be equal to the LE_Scan_Interval, which indicates continuous scanning.

To be open to repeated collision of Scan Requests, multiple Scanners have the same or substantially the same Scan Interval and Scan Window, and for continuous scanning, only the Scan Interval needs to be the same or substantially the same. In addition, the Scanners should be in-phase, which is to say their scanning intervals are aligned or almost aligned. In the following, the relative phase of the scan sequences is described, and that phase generally depends on the moments when different Scanners have been activated by their users. In any event, the case of repeated collision of Scan Request is not a trivial one, as it can correspond, for example, to the default scanning setting in many devices.

Simulation of Conventional Backoff Procedure

The inventors have recognized that problems with the conventional backoff procedure originate in the superposition of the scanning channels used by multiple Scanners that can occur when the channel scanning sequences of two (or more) Scanners are aligned or almost aligned, and when the Scanners use the same scanning parameters as discussed above.

Figure 2:
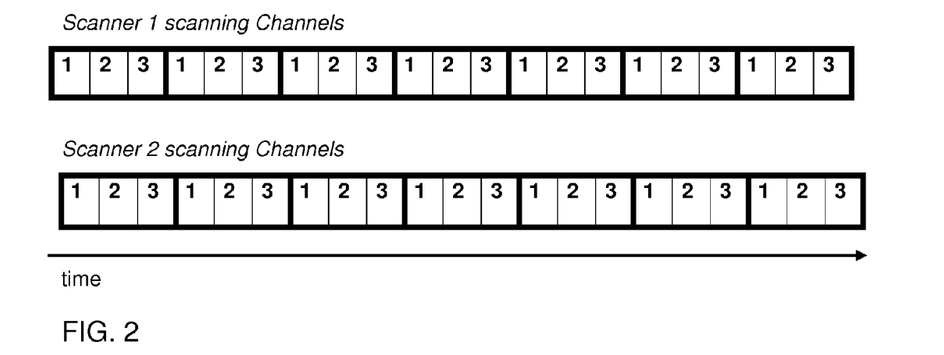
FIG. 2 depicts almost aligned channel scanning sequences.

FIG. 2 depicts that situation, showing the channel sequence (i.e., 1, 2, 3, 1, 2, 3, . . . ) used for scanning by Scanner 1 and Scanner 2. It will be appreciated that the channel sequence can in general include more than just three different channels. As depicted in FIG. 2 from the point of view of the Advertiser, the channel scanning sequence used by the Scanner 2 is slightly delayed in time with respect to the channel scanning sequence used by the Scanner 1. As shown, the delay does not change with time, which indicates that Scanners 1 and 2 are using the same scanning parameters, e.g., the same default values. Thus, the scan sequences are at least partly aligned, which is to say that the sequences call for the same channel at the same time at least some of the time. Put another way, the scanning intervals at least partly overlap and the scanning channels at least partly overlap. It will be understood that more than two Scanners can scan with same scanning sequence and be in the situation depicted by FIG. 2.

Whether Scan Request collisions occur with the conventional backoff procedure when two Scanners use the same scan sequence depends on the frequency of, or interval between, an Advertiser's advertising packets and the percentage of alignment between the scanning windows of the Scanners. If the advertising interval is an integer multiple of the Scanners' scanning interval (which is a non-trivial case), collisions either occur continually or never occur. The probability of collisions occurring is substantially the percentage of alignment between the scanning intervals, i.e., collisions are sure to happen for 100%-aligned intervals, to have a 50% probability of happening for 50%-aligned intervals, etc. If the advertising packet interval is not an integer multiple of the Scanners' scanning interval, collisions can still occur but may be mitigated, as each Scanner may be able to receive some advertisements that the other Scanner would not be able to receive because the Scanners scan on different channels for some of the time. In that case, collisions would not occur all the time, but the more the Scanners' scanning intervals overlap, the more collisions occur.

tion in which it was unable to collect any more Scan Responses from the Advertiser, as indicated by the unchanging number of Scan Responses received.

For each Scanner, the upperLimit parameter roughly indicates how much time the Scanner disabled itself from sending a Scanner Request in order not to collide with other Scanners. In the early scanning intervals, Scanners 1 and 2 "fought" to prevail, with the upperLimit parameter of Scanner 1 reaching a maximum value of 4, but later than the upperLimit parameter of Scanner 2 reached that value. At the end of the simulation range, in interval 31, Scanner 1 had an upper limit of only 1, while Scanner 2 had its upper limit grown rapidly to 16. With an upper limit of 1, Scanner 1 would send Scan Requests to the Advertiser without trying to avoid collision with Scanner 2. With an upper limit of 16, Scanner 2 would wait an average of 8 scanning intervals before sending a Scan Request.

TABLE 1

| | DEVICE_1 | | | | | DEVICE_2 | | | |
|---|---|---|---|---|---|---|---|---|---|
| T | Ch | backoff Count | upper Limit | Collide | Total Scan Resp | Ch | backoff Count | upper Limit | Collide | Total Scan Resp |
| 0 | 1 | 1 | 1 | True | 0 | 1 | 1 | 1 | True | 0 |
| 1 | 2 | 1 | 1 | True | 0 | 2 | 1 | 1 | True | 0 |
| 2 | 3 | 2 | 2 | False | 0 | 3 | 1 | 2 | False | 1 |
| 3 | 1 | 1 | 2 | False | 1 | 1 | 2 | 2 | False | 1 |
| 4 | 2 | 1 | 2 | True | 1 | 2 | 1 | 2 | True | 1 |
| 5 | 3 | 1 | 2 | False | 2 | 3 | 2 | 2 | False | 1 |
| 6 | 1 | 1 | 2 | True | 2 | 1 | 1 | 2 | True | 1 |
| 7 | 2 | 2 | 2 | False | 2 | 2 | 2 | 4 | False | 1 |
| 8 | 3 | 1 | 2 | True | 2 | 3 | 1 | 4 | True | 1 |
| 9 | 1 | 3 | 4 | False | 2 | 1 | 2 | 4 | False | 1 |
| 10 | 2 | 2 | 4 | False | 2 | 2 | 1 | 4 | False | 2 |
| 11 | 3 | 1 | 4 | False | 3 | 3 | 4 | 4 | False | 2 |
| 12 | 1 | 1 | 4 | False | 4 | 1 | 3 | 4 | False | 2 |
| 13 | 2 | 2 | 2 | False | 4 | 2 | 2 | 4 | False | 2 |
| 14 | 3 | 1 | 2 | True | 4 | 3 | 1 | 4 | True | 2 |
| 15 | 1 | 2 | 2 | False | 4 | 1 | 4 | 4 | False | 2 |
| 16 | 2 | 1 | 2 | False | 5 | 2 | 3 | 4 | False | 2 |
| 17 | 3 | 2 | 2 | False | 5 | 3 | 2 | 4 | False | 2 |
| 18 | 1 | 1 | 2 | True | 5 | 1 | 1 | 4 | True | 2 |
| 19 | 2 | 2 | 2 | False | 5 | 2 | 5 | 8 | False | 2 |
| 20 | 3 | 1 | 2 | False | 6 | 3 | 4 | 8 | False | 2 |
| 21 | 1 | 1 | 2 | False | 7 | 1 | 3 | 8 | False | 2 |
| 22 | 2 | 1 | 1 | False | 8 | 2 | 2 | 8 | False | 2 |
| 23 | 3 | 1 | 1 | True | 8 | 3 | 1 | 8 | True | 2 |
| 24 | 1 | 1 | 1 | False | 9 | 1 | 7 | 8 | False | 2 |
| 25 | 2 | 1 | 1 | False | 10 | 2 | 6 | 8 | False | 2 |
| 26 | 3 | 1 | 1 | False | 11 | 3 | 5 | 8 | False | 2 |
| 27 | 1 | 1 | 1 | False | 12 | 1 | 4 | 8 | False | 2 |
| 28 | 2 | 1 | 1 | False | 13 | 2 | 3 | 8 | False | 2 |
| 29 | 3 | 1 | 1 | False | 14 | 3 | 2 | 8 | False | 2 |
| 30 | 1 | 1 | 1 | True | 14 | 1 | 1 | 8 | True | 2 |
| 31 | 2 | 1 | 1 | False | 15 | 2 | 15 | 16 | False | 2 |

The case of two Scanners having channel scanning sequences aligned as in FIG. 2 was simulated with a computer program that implemented the backoff procedure currently specified by the Link Layer Specification in a group of N Scanners. The program calculated numbers of Scan Request collisions between the N Scanners in the group.

Table 1 gives results of one execution of the computer program for a group of two Scanners 1, 2, showing for each Scanner for 31 different scan intervals T, the scanning channel used, a backoffCount parameter, the upperLimit parameter, whether a collision occurred (True/False), and a total number of Scan Responses received.

Table 1 shows that Scanner 2 was strongly disadvantaged with the conventional backoff procedure, arriving in a situa- It can be seen from the Table 1 that when Scanner 2 started to be highly disadvantaged, having high upperLimit values, Scanner 1 was able to return to an upperLimit value of 1. Scanner 2 could have sent a Scan Request as soon as its backoffCount value returned to 1, but Scanner 1 already had a backoffCount value of 1 and so was sending Scan Requests without backing off. Therefore, even if a Scan Request by Scanner 2 (which is backing off) could have been sent, it would have inevitably collided with a Scan Request sent by Scanner 1 (which is NOT backing off).

Scanner 2 could not escape this "locked-out" situation, in which bidirectional communication between Scanner 2 and the Advertiser was prevented. This behavior is a typical pattern that might take more or fewer scanning intervals to happen, but it will happen. One or more Scanners will find itself in a locked-out situation, while another Scanner can return to the initial state, with upperLimit=1.

Figure 3:
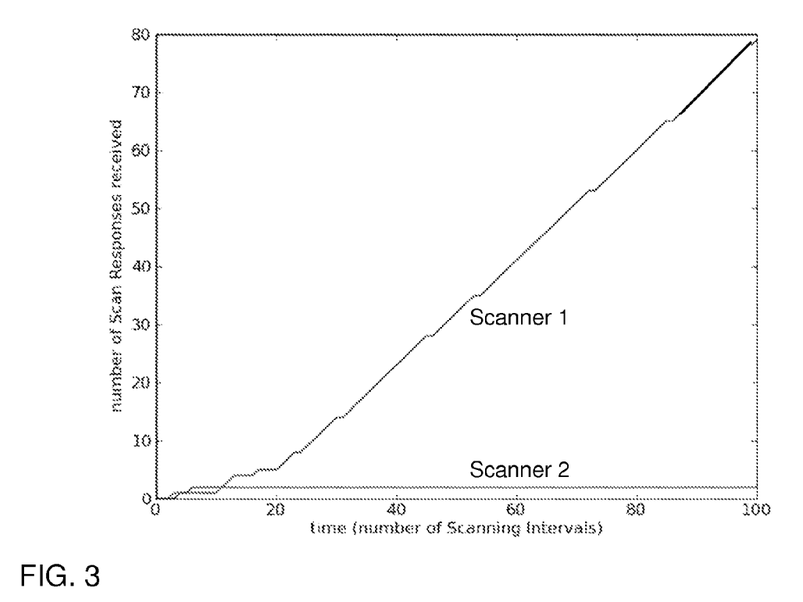
FIG. 3 is a plot of simulated numbers of Scan Responses collected by two Scanners using a current backoff procedure.

The collision problem can also be appreciated from FIG. 3, which is a plot indicating the simulated numbers of Scan Responses collected by Scanner 1 and Scanner 2. In FIG. 3, the number of scanning intervals is 100, rather than just 31 as in Table 1, and yet Scanner 2 still is unable to receive more than two Scan Responses, while Scanner 1 is able to regularly receive Scan Responses.

Simulation of Improved Backoff Procedures

The inventors have recognized that problems with the current backoff procedure can be solved by introducing a randomization of the scanning channels used by Scanners. Such randomization is permitted by subsection 4.4.3 of the Link Layer Specification of the current BLUETOOTH Specification, which merely provides that "In each scan window, the Link Layer should scan on a different advertising channel index. The Link Layer shall use all the advertising channel indexes."

In a first embodiment of this invention, Scanners are configured so that they implement a completely free randomization of the scanning channels with respect to the scanning intervals. This reduces the probability that two Scanners will scan over the same channels, i.e., use the same scanning channel sequence, to no more than ⅓, and thereby results in a much lower number of collisions and a much less problematic backoff procedure.

Figure 4:
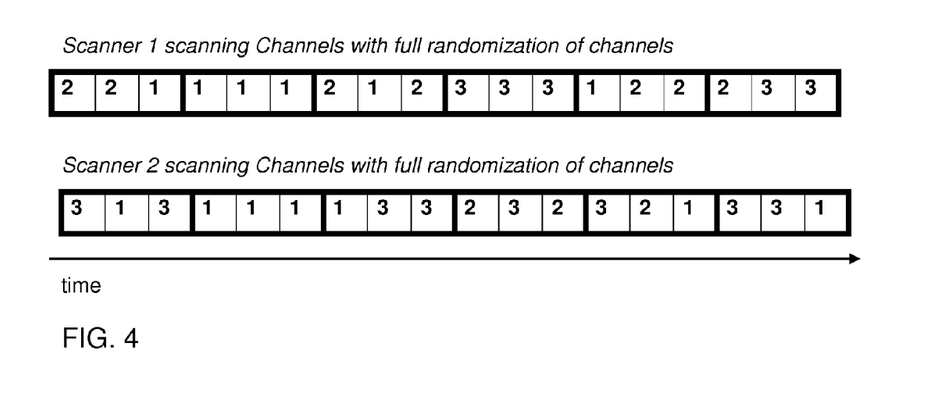
FIG. 4 depicts almost aligned channel scanning sequences with completely free randomizations.

FIG. 4 depicts two scanning channel sequences with completely free randomizations, which is to say, mutually independent randomization in each scanning interval, that can be used for scanning by an improved Scanner 1 and an improved Scanner 2. It will be appreciated that the channel sequence can in general include more than just three different channels. As depicted in FIG. 4 from the point of view of the Advertiser, the intervals of the channel scanning sequence used by improved Scanner 2 are almost aligned with the intervals of the channel scanning sequence used by improved Scanner 1. It will also be appreciated that randomizing the plurality of communication channels of a channel sequence with respect to the scanning intervals that are respective to a Scanner results in a channel sequence with a substantially random autocorrelation and a substantially random correlation with other channel sequences. In other words, the channel sequence is one of a set of channel sequences that are not mutually orthogonal.

Table 2 gives results of one execution of a computer simulation program that implemented the improved backoff procedure in a group of two improved Scanners 1, 2, showing for each Scanner for 31 different scan intervals T, the scanning channel used, a backoffCount parameter, the upperLimit parameter, whether a collision occurred (True/False), and a total number of Scan Responses received.

Table 2 shows that Scanner 2 was not strongly disadvantaged with respect to Scanner 1, as it was with the conventional backoff procedure in Table 1. Both Scanners 1, 2 were able to continue collecting Scan Responses from the Advertiser, as indicated by the increasing numbers of Scan Responses received by the Scanners.

When there are more than two Scanners that have aligned or almost-aligned scanning intervals, it is more likely that at least two of the Scanners (or pairs of Scanners, with more than one pair) will transmit simultaneously on the same channel. Simulations of three Scanners having fully aligned scanning sequences indicate that each Scanner would be able to send some Scan Responses. A Scanner might be temporarily disadvantaged (due to a high upperLimit value), but eventually the randomness of the scanning channels enables the Scanner to recover and be able to transmit other Scan Responses. Similar behavior is currently expected for situations involving more than three Scanners with aligned or almost-aligned scanning intervals, and such situations are currently expected to be less likely.

TABLE 2

| | DEVICE_1 | | | | | DEVICE_2 | | | |
| --- | --- | --- | --- | --- | --- | --- | --- | --- | --- |
| T | Ch | backoff Count | upper Limit | Collide | Total Scan Resp | Ch | backoff Count | upper Limit | Collide | Total Scan Resp |
| 0 | 1 | 1 | 1 | False | 1 | 2 | 1 | 1 | False | 1 |
| 1 | 3 | 1 | 1 | True | 1 | 3 | 1 | 1 | True | 1 |
| 2 | 2 | 1 | 1 | False | 2 | 3 | 1 | 1 | False | 2 |
| 3 | 3 | 1 | 1 | False | 3 | 1 | 1 | 1 | False | 3 |
| 4 | 2 | 1 | 1 | True | 3 | 2 | 1 | 1 | True | 3 |
| 5 | 3 | 1 | 1 | False | 4 | 1 | 1 | 1 | False | 4 |
| 6 | 3 | 1 | 1 | False | 5 | 1 | 1 | 1 | False | 5 |
| 7 | 1 | 1 | 1 | False | 6 | 3 | 1 | 1 | False | 6 |
| 8 | 2 | 1 | 1 | False | 7 | 1 | 1 | 1 | False | 7 |
| 9 | 1 | 1 | 1 | False | 8 | 3 | 1 | 1 | False | 8 |
| 10 | 1 | 1 | 1 | False | 9 | 3 | 1 | 1 | False | 9 |
| 11 | 2 | 1 | 1 | False | 10 | 1 | 1 | 1 | False | 10 |
| 12 | 3 | 1 | 1 | True | 10 | 3 | 1 | 1 | True | 10 |
| 13 | 3 | 1 | 1 | False | 11 | 2 | 1 | 1 | False | 11 |
| 14 | 2 | 1 | 1 | False | 12 | 3 | 1 | 1 | False | 12 |
| 15 | 3 | 1 | 1 | True | 12 | 3 | 1 | 1 | True | 12 |
| 16 | 3 | 1 | 1 | False | 13 | 1 | 1 | 1 | False | 13 |
| 17 | 3 | 1 | 1 | False | 14 | 1 | 1 | 1 | False | 14 |
| 18 | 1 | 1 | 1 | True | 14 | 1 | 1 | 1 | True | 14 |
| 19 | 1 | 1 | 1 | True | 14 | 1 | 1 | 1 | True | 14 |
| 20 | 1 | 1 | 2 | False | 15 | 2 | 1 | 2 | False | 15 |
| 21 | 1 | 2 | 2 | False | 15 | 3 | 1 | 2 | False | 16 |
| 22 | 2 | 1 | 2 | True | 15 | 2 | 1 | 1 | True | 16 |
| 23 | 3 | 2 | 2 | False | 15 | 1 | 1 | 1 | False | 17 |
| 24 | 3 | 1 | 2 | False | 16 | 1 | 1 | 1 | False | 18 |
| 25 | 1 | 2 | 2 | False | 16 | 3 | 1 | 1 | False | 19 |
| 26 | 1 | 1 | 2 | False | 17 | 3 | 1 | 1 | False | 20 |
| 27 | 1 | 1 | 1 | False | 18 | 3 | 1 | 1 | False | 21 |

TABLE 2-continued

| | DEVICE_1 | | | | | DEVICE_2 | | | |
|---|---|---|---|---|---|---|---|---|---|
| T | Ch | backoff Count | upper Limit | Collide | Total Scan Resp | Ch | backoff Count | upper Limit | Collide | Total Scan Resp |
| 28 | 1 | 1 | 1 | False | 19 | 3 | 1 | 1 | False | 22 |
| 29 | 1 | 1 | 1 | False | 20 | 2 | 1 | 1 | False | 23 |
| 30 | 3 | 1 | 1 | True  | 20 | 3 | 1 | 1 | True  | 23 |
| 31 | 3 | 1 | 1 | False | 21 | 1 | 1 | 1 | False | 24 |

Figure 5:
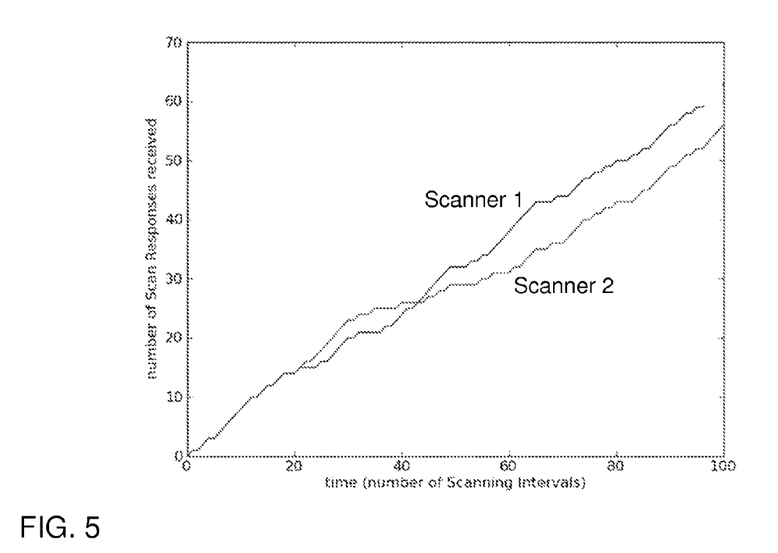
FIG. 5 is a plot of simulated numbers of Scan Responses collected by two Scanners using a backoff procedure with full scanning channel randomization.

The improvement can also be appreciated from FIG. 5, which is a plot indicating the simulated numbers of Scan Responses collected by Scanner 1 and Scanner 2. In FIG. 5, the number of scanning intervals is 100, rather than just 31 as in Table 1, and Scanner 2 continued to be able to receive Scan Responses, as did Scanner 1.

It can also be seen from FIG. 4 and Table 2 that both Scanners 1, 2 use all channels (i.e., channels 1, 2, and 3, in this example) as required by Subsection 4.4.3 of the current Link Layer Specification, although they do not use a different channel in each interval (i.e., successive channels are not always different), as recommended by Subsection 4.4.3. Indeed, at T=18, 19, 20, 21 and 25, 26, 27, 28, 29, the Scanner 1 uses scanning channel 1 several times in a row, and the Scanner 2 behaves similarly. Moreover, it is possible for a scanning channel to be unused for many successive scanning intervals.

In a second embodiment of this invention, scanning channel sequences are randomized differently, such that over a predetermined period, e.g., a block, or group, of three scanning intervals, a scanning channel is not repeated. In this way, a "fair randomness" in scanning-channel sequences can be provided. The number of scanning intervals in a block or group, which can be called the block size, depends on the number of scanning channels available, and the block size can be the number of scanning channels available or an integer multiple of that number. It will be understood, however, that in general, the block size can have other values. The BLUETOOTH low-energy (BLE) mode specification calls for 37 channels for BLE Connection scenarios and three channels for BLE Advertising scenarios, and so the block size can be three.

For an example of BLE Scanners using three channels, the block size determines that there are six different channel sequences. In general, the number of different scanning channel sequences is just N!, where N is the block size and ! indicates factorial. For example, the channel sequences are advantageously stored in each Scanner in a table and randomly selected independent of other Scanners' selections. A Scanner can generate a scanning channel by selecting a stored scanning channel sequence for a block. The sequence can be selected by generating a random or pseudo-random integer between 1 and 6 for the respective block, using the generated number as an index in the table of channel sequences, and retrieving the stored sequence. Of course, it will be understood that there are other equivalent ways for a Scanner to select stored channel sequence for respective blocks of scanning intervals.

Figure 6:
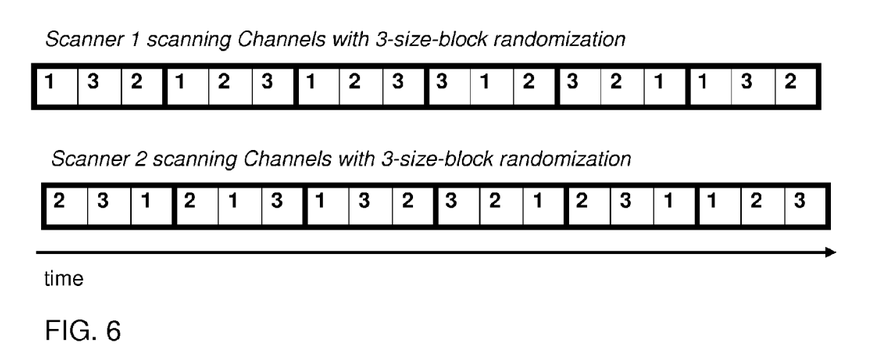
FIG. 6 depicts almost aligned channel scanning sequences with block-wise randomizations.

FIG. 6 depicts two scanning channel sequences with such block-wise randomizations that can be used for scanning by an improved Scanner 1 and an improved Scanner 2. It will be appreciated that the channel sequence can include more than just three different channels. As depicted in FIG. 6 from the point of view of the Advertiser, the channel scanning sequence used by the Scanner 2 is almost aligned with the channel scanning sequence used by the Scanner 1. It will again be appreciated that randomizing the plurality of communication channels of a channel sequence with respect to the scanning intervals that are respective to a Scanner results in a channel sequence with a substantially random autocorrelation and a substantially random correlation with other channel sequences. In other words, the channel sequence is one of a set of channel sequences that are not mutually orthogonal.

Comparing FIG. 6 with FIG. 4, it can be seen that block-wise randomization reduces random fluctuations to the extent that a scanning channel is not repeated in long strings of adjacent intervals, but a scanning channel can still be repeated in adjacent intervals in successive blocks, e.g., in the ninth and tenth intervals for Scanner 1.

Figure 7:
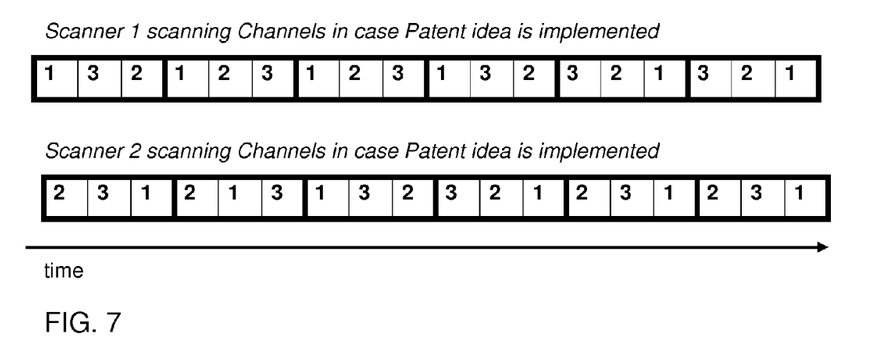
FIG. 7 depicts almost aligned channel scanning sequences with improved randomizations.

In a third embodiment of this invention, scanning channel sequences include randomizations such that a scanning channel is not used in adjacent intervals. FIG. 7 depicts two scanning channel sequences with such randomizations that can be used for scanning by an improved Scanner 1 and an improved Scanner 2. As described above, a BLE Scanner with three scanning channels, for example, has six possible scanning channel sequences to choose from, and those sequences can be stored in a table in each Scanner and randomly selected by each Scanner independent of other Scanners' selections.

In this embodiment, a Scanner can select a stored scanning channel sequence by generating, for the first block k=0 of a succession of blocks, a seqID value, which is a random or pseudo-random integer between 0 and 5. The seqID values identify corresponding scanning channel sequences in a table, such as Table 3:

TABLE 3

| seqID | sequence | baseSeqID |
|---|---|---|
| 0 | 123 | 0 |
| 1 | 132 | 4 |
| 2 | 213 | 0 |
| 3 | 231 | 2 |
| 4 | 312 | 4 |
| 5 | 321 | 2 |

Table 3, which is suitable for n=3 total channels, can be expressed analytically by the following equations:

$$seqID_0 = rand\{0,1,2,3,4,5\}$$

$$seqID_k = mod(baseSeqID_{k-1} + rand\{0,1,2,3\}_k, 6)$$

in which index k is an integer between 0 and 5 (which is to say, between 0 and n!−1), rand{.} indicates the random function, and mod {.,.} indicates the modulo function.

It can be noted that the baseSeqID entry is set to 0 so that the following block will be chosen from seqID 0-3; the baseSeqID entry is set to 2 so that the following block will be chosen from seqID 0, 1, 4, or 5; and the baseSeqID entry is set to 4 so that the following block will be chosen from seqID 2-5.

Thus, it will be understood that baseSeqID is a completeness parameter that ensures use of all sequences of the n channels. The mapping of seqID to sequence determines suitable values for the baseSeqID entries.

As an example, for the first block, let the generated seqID value be denoted $seqID_0$, and the Scanner selects the sequence corresponding to the $seqID_0$ value, and notes the corresponding baseSeqID value, which can be denoted $baseSeqID_0$. For the second block succeeding the first, the Scanner generates a respective random or pseudo-random integer between 0 and 3, adds that integer and the $baseSeqID_0$ value, and takes the modulo-6 of that sum (in order to wrap around in the table of sequences) to determine a $seqID_1$ value. The Scanner selects the corresponding channel sequence for the second block, and notes the $baseSeqID_1$ value. The process is then repeated for each succeeding block n with updated values of seqID and baseSeqID.

It will be understood that the preceding equations hold for the Table 3 but that other embodiments can use other tables and corresponding equations. The important thing is that the last channel of one block in a sequence is not the same as the first channel of the following block.

For the general case of n channels arbitrarily numbered 1, 2, . . . , n, a suitable table of scanning sequences is as follows:

TABLE 4

| seqID | sequence | baseSeqID |
|---|---|---|
| 0 | 1 2 . . . n | 0 |
| . | . | . |
| . | . | . |
| . | . | . |
| (n − 1)! − 1 | 1 n . . . 2 | 2 · (n − 1)! |
| (n − 1)! | 2 1 . . . n | 0 |
| . | . | . |
| . | . | . |
| . | . | . |

TABLE 4-continued

| seqID | sequence | baseSeqID |
|---|---|---|
| 2 · (n − 1)! − 1 | 2 n . . . 1 | (n − 1)! |
| . | . | . |
| . | . | . |
| . | . | . |
| (n − 1) · (n − 1)! | n 1 . . . n − 1 | (n − 1) · (n − 1)! |
| . | . | . |
| . | . | . |
| . | . | . |
| n! − 1 | n (n − 1) . . . 1 | (n − 1)! |

Table 4 can be expressed analytically by the following equations:

$seqID_0 = \text{rand}\{0, \ldots, n!-1\}$ $seqID_k = \text{mod}(baseSeqID_{k-1} + \text{rand}\{0, \ldots, (n-1) \cdot (n-1)!-1\}_k, n!)$ in which index k is an integer between 0 and n−1, rand{.} indicates the random function, (.)! indicates factorial, and mod {., .} indicates the modulo function.

In general, sequences are arranged in a table, such as Tables 3 and 4, so that all sequences starting with the first channel (channel 1) are listed first, then the sequences starting with the second channel (channel 2) are listed, and so forth, until the sequences starting with the last channel (channel n). It will be noted that as the n channels are arbitrarily numbered, Table 4 and the corresponding equations represent every set of sequences of n channels, with each sequence including all n channels and each channel only once.

Table 5 gives results of one execution of a computer simulation program that implemented the improved backoff procedure with scanning channel sequences that included randomizations such that a scanning channel was not used in adjacent intervals in a group of two Scanners 1, 2. Table 5 shows for each Scanner for 31 different scan intervals T, the scanning channel used, a backoffCount parameter, the upperLimit parameter, whether a collision occurred (True/False), and a total number of Scan Responses received.

TABLE 5

| | DEVICE_1 | | | | | DEVICE_2 | | | | |
|---|---|---|---|---|---|---|---|---|---|---|
| T | Ch | backoff Count | upper Limit | Collide | Total Scan Resp | Ch | backoff Count | upper Limit | Collide | Total Scan Resp |
| 0 | 1 | 1 | 1 | True | 0 | 1 | 1 | 1 | True | 0 |
| 1 | 3 | 1 | 1 | True | 0 | 3 | 1 | 1 | True | 0 |
| 2 | 2 | 2 | 2 | False | 0 | 2 | 2 | 2 | False | 0 |
| 3 | 3 | 1 | 2 | True | 0 | 3 | 1 | 2 | True | 0 |
| 4 | 1 | 2 | 2 | False | 0 | 1 | 2 | 2 | False | 0 |
| 5 | 2 | 1 | 2 | True | 0 | 2 | 1 | 2 | True | 0 |
| 6 | 1 | 1 | 4 | False | 1 | 3 | 3 | 4 | False | 0 |
| 7 | 3 | 1 | 4 | False | 2 | 2 | 2 | 4 | False | 0 |
| 8 | 2 | 1 | 2 | False | 3 | 1 | 1 | 4 | False | 1 |
| 9 | 1 | 1 | 2 | False | 4 | 2 | 1 | 4 | False | 2 |
| 10 | 2 | 1 | 1 | False | 5 | 1 | 2 | 2 | False | 2 |
| 11 | 3 | 1 | 1 | True | 5 | 3 | 1 | 2 | True | 2 |
| 12 | 2 | 1 | 1 | False | 6 | 1 | 1 | 2 | False | 3 |
| 13 | 1 | 1 | 1 | False | 7 | 2 | 2 | 2 | False | 3 |
| 14 | 3 | 1 | 1 | True | 7 | 3 | 1 | 2 | True | 3 |
| 15 | 1 | 1 | 1 | False | 8 | 2 | 1 | 2 | False | 4 |
| 16 | 3 | 1 | 1 | False | 9 | 3 | 2 | 2 | False | 4 |
| 17 | 2 | 1 | 1 | False | 10 | 1 | 1 | 2 | False | 5 |
| 18 | 1 | 1 | 1 | False | 11 | 2 | 1 | 1 | False | 6 |
| 19 | 2 | 1 | 1 | False | 12 | 1 | 1 | 1 | False | 7 |
| 20 | 3 | 1 | 1 | True | 12 | 3 | 1 | 1 | True | 7 |
| 21 | 1 | 1 | 1 | False | 13 | 2 | 1 | 1 | False | 8 |
| 22 | 2 | 1 | 1 | False | 14 | 1 | 1 | 1 | False | 9 |
| 23 | 3 | 1 | 1 | True | 14 | 3 | 1 | 1 | True | 9 |
| 24 | 2 | 1 | 1 | False | 15 | 1 | 1 | 1 | False | 10 |
| 25 | 3 | 1 | 1 | False | 16 | 2 | 1 | 1 | False | 11 |
| 26 | 1 | 1 | 1 | False | 17 | 3 | 1 | 1 | False | 12 |

TABLE 5-continued

| | | DEVICE_1 | | | | | DEVICE_2 | | | |
|---|---|---|---|---|---|---|---|---|---|---|
| T | Ch | backoff Count | upper Limit | Collide | Total Scan Resp | Ch | backoff Count | upper Limit | Collide | Total Scan Resp |
| 27 | 2 | 1 | 1 | True  | 17 | 2 | 1 | 1 | True  | 12 |
| 28 | 3 | 1 | 1 | False | 18 | 1 | 1 | 1 | False | 13 |
| 29 | 1 | 1 | 1 | False | 19 | 3 | 1 | 1 | False | 14 |
| 30 | 3 | 1 | 1 | False | 20 | 1 | 1 | 1 | False | 15 |
| 31 | 2 | 1 | 1 | True  | 20 | 2 | 1 | 1 | True  | 15 |

Figure 8:
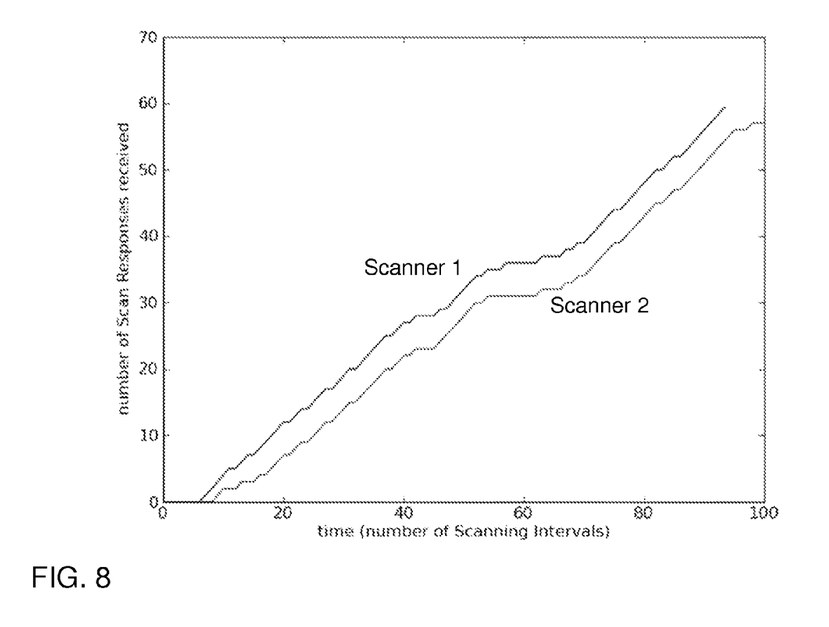
FIG. 8 is a plot of simulated numbers of Scan Responses collected by two Scanners using a backoff procedure with improved scanning channel randomization.

The improvement can also be appreciated from FIG. 8, which is a plot indicating the simulated numbers of Scan Responses collected by Scanner 1 and Scanner 2. In FIG. 8, the number of scanning intervals is 100, rather than just 31 as in Table 1, and it can be seen that the number of successes for the two Scanners was well balanced, as it was in Table 2 and FIG. 5.

Thus as described above and as depicted by the flowchart in FIG. 9A, a channel sequence can be generated by a method that includes identifying (step 902) a plurality of communication channels to be used in the sequence, where the sequence includes a succession of intervals with each interval having a respective channel. In accordance with the current BLE specification, there are three possible channels and all three are to be used in a channel sequence for Scan Request messages. In step 904, the channels to be used in the sequence randomized, and in step 906, information, such as Scan Requests, is sent on the plurality of channels according to the channel sequence.

Figure 9A:
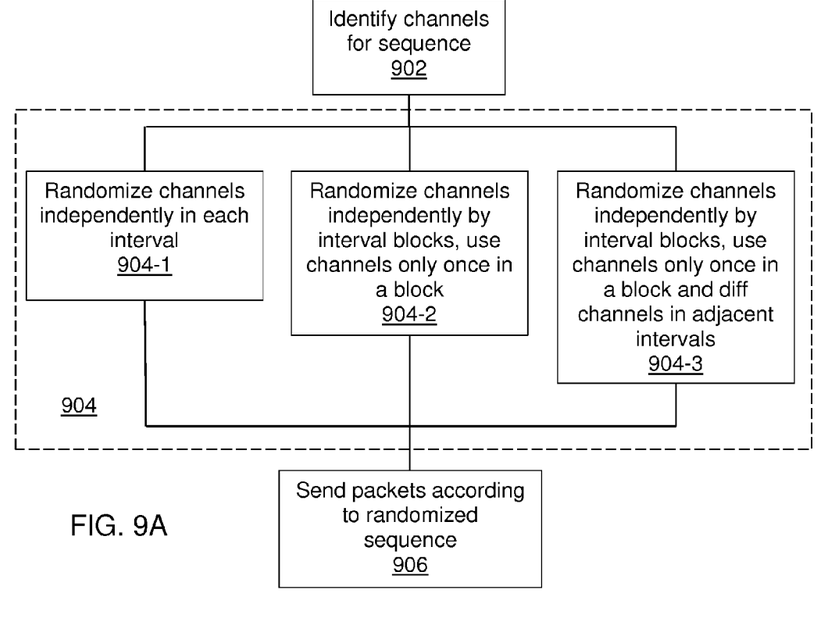
FIGS. 9A, 9B, 9C are flow charts of methods of generating randomized channel sequences.

As described above, the randomization in step 904 can be carried out in any of at least three ways and their equivalents. As indicated by step 904-1, each channel to be used in each interval is randomly or pseudo-randomly independently determined. As indicated by step 904-2, the scan sequence is divided into successive blocks of a plurality of intervals, and each channel to be used in each interval in a block is randomly or pseudo-randomly determined, with each channel in a block to be used only once in that block and each block independent of the other blocks. As indicated by step 904-3, the scan sequence is divided into successive blocks of a plurality of intervals, and each channel to be used in each interval in a block is randomly or pseudo-randomly determined, with each channel in a block to be used only once in that block and with different channels to be used in adjacent intervals in adjacent blocks.

Figure 9B:
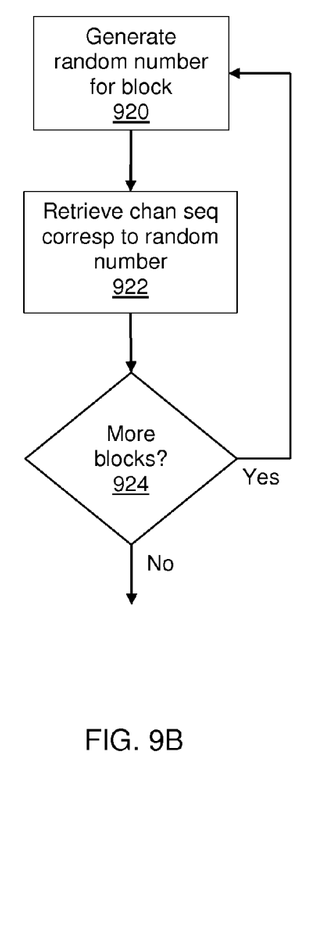

As described above in connection with the second embodiment and as depicted in FIG. 9B, a transmitter such as a Scanner can randomize a channel sequence (step 904-2) by generating (step 920) a random or pseudo-random integer between 1 and 6 for the respective block as an index in a table of predetermined channel sequences, and retrieving (step 922) the stored sequence corresponding to the index. If more blocks remain (Yes in step 924), the process flow returns and another integer is generated. Otherwise (No in step 924), the flow continues.

Figure 9C:
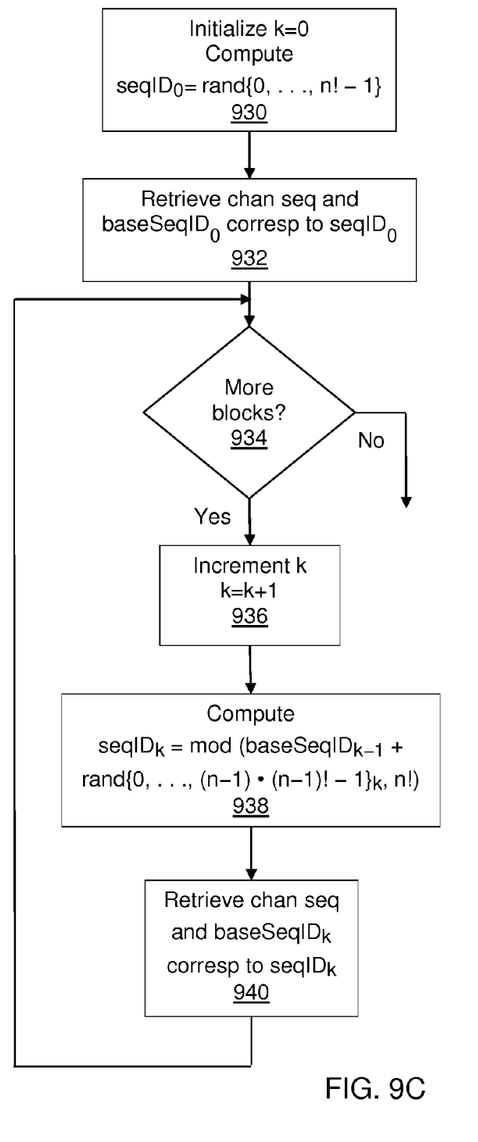

As described above in connection with the third embodiment and as depicted in FIG. 9C, a transmitter such as a Scanner can randomize a channel sequence (step 904-3) by initializing (step 930) a block index k value to zero and computing a corresponding $seqID_0$ according to the tables and equations given above, and retrieving (step 932) a corresponding stored channel sequence and $baseSeqID_0$. If more blocks remain (Yes in step 934), the index k is incremented (step 936) and a corresponding $seqID_k$ value is computed (step 938) according to the tables and equations given above, and a corresponding stored channel sequence and $baseSeqID_k$ are retrieved (step 940). If more blocks remain (Yes in step 934), the process flow repeats steps 936, 938, 940. Otherwise, (No in step 934), the flow continues.

Figure 10:
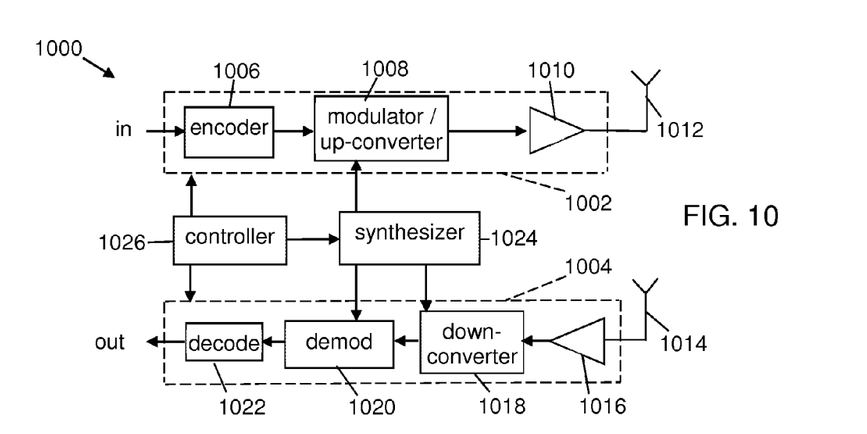
FIG. 10 is a block diagram of an exemplary communication device.

FIG. 10 is a block diagram of a device 1000 that can operate as a Scanner according to the BLUETOOTH system specification with an improved backoff procedure as described above. The device 1000 includes a transmitter (TX) section 1002 and a receiver (RX) section 1004. Messages to be transmitted, such as Scan Requests, are passed by an input of the TX section 1002 to an encoder 1006, which preferably processes the input information according to an error-correcting code and, perhaps, a security code. Forward error correction and scrambling codes are well known in the art of cellular radio telephony, so they need not be described in more detail here. The encoded information produced by the encoder 1006 is provided to a modulator/up-converter 1008, which modulates a higher-frequency carrier signal with the encoded information according to the format and access technique employed by the system, including in the case of Scan Requests, one of the improved scanning channel sequences described above. The magnitude of the modulated carrier produced by the modulator/up-converter 1008 is then typically increased by a power amplifier 1010, which provides its output signal to a communication channel, such as the air via a suitable TX antenna 1012.

In the RX section 1004, a portion of a modulated carrier signal received from the communication channel, such as the air, by a suitable RX antenna 1014 is provided to an amplifier 1016, which increases the magnitude of the received portion (preferably without adding substantial noise) and provides the increased modulated carrier signal to a down-converter 1018. The carrier signal is stripped away by the down-converter 1018, and the resulting signal is provided to a demodulator 1020 that in essence produces a replica of the encoded information, such as a Scan Response, that modulated the carrier signal. That encoded information is decoded by a decoder 1022, and the received information is passed by an output of the RX section 1004 to a user or further processing devices.

The modulator/up-converter 1008, down-converter 1018, and demodulator 1020 carry out their functions using local oscillator and other signals having precisely controlled frequencies, which may be generated by a suitable synthesizer 1024. The frequencies selected for the synthesizer, such as the improved scanning channel sequences described above, and other aspects of the terminal 1000 are determined by control signals provided by a controller 1026, which can be a suitably programmed signal processor circuit or logic circuit that includes one or more suitable memories for storing tables of block sequences of channels and table index information. For example, the controller 1026 can be configured to cause the transmitter portion to transmit Scan Request messages on communication channels according to an improved sequence as described above.

This application shows the increased communication efficiency that can be provided by the above-described improved channel scanning sequences. Without the inventive improvement, a Scanner may not be able to communicate with an Advertiser, as the current backoff procedure can effectively prevent the Scanner's Scan Requests from being received by the Advertiser.

It will be appreciated that many of the several blocks of the devices depicted in FIGS. 1 and 10 can be implemented by one or more suitably programmed electronic processors, collections of logic gates, etc. that process information stored in one or more memories. The stored information can include program instructions and data that enable the blocks to implement the methods described above. It will be appreciated that the devices typically include timers, etc. that facilitate their operations.

It will also be appreciated that procedures described above are carried out repetitively as necessary, for example, to respond to the time-varying nature of communication channels between transmitters and receivers. The methods and devices described above can be combined and re-arranged in a variety of equivalent ways, and the methods can be performed by one or more suitably programmed or configured digital signal processor circuits and other known electronic circuits (e.g., discrete logic gates interconnected to perform a specialized function, or application-specific integrated circuits). Many aspects of this invention are described in terms of sequences of actions that can be performed by, for example, elements of a programmable computer system. Devices embodying this invention include, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the appended claims.

What is claimed is:

1. A terminal for a communication system, comprising:
a transmitter configured to send scan request messages through a plurality of communication channels according to a respective channel sequence that specifies a succession of time intervals and a respective communication channel to be used during each interval, wherein the plurality of communication channels of the channel sequence are randomized with respect to the intervals that are respective to the terminal by:
(a) randomly or pseudo-randomly independently determining the respective communication channel to be used in each interval; or
(b) dividing the succession of intervals into successive blocks that each include a plurality of successive intervals and randomly or pseudo-randomly determining the channels to be used in each block, with each channel in a block to be used only once in that block and each block independent of the other blocks; or
(c) dividing the succession of intervals into successive blocks that each include a plurality of successive intervals and randomly or pseudo-randomly determining the channels to be used in each block, with each channel in a block to be used only once in that block and with different channels to be used in adjacent intervals in adjacent blocks;
wherein step (c) includes computing, for each successive block k, a $seqID_k$ value according to:

$$seqID_k = \mathrm{mod}(baseSeqID_{k-1} + \mathrm{rand}\{0, \ldots, (n-1) \cdot (n-1)! - 1\}_k, n!)$$

in which n is a total number of channels, mod (.,.) represents a modulo function, rand{.} represents a randomization function, .! represents factorial, $baseSeqID_{k-1}$ is a completeness parameter, the channels are respectively numbered 1, 2, ..., n, and $seqID_0 = \mathrm{rand}\{0, \ldots, n!-1\}$; and retrieving for each successive block k a stored channel sequence corresponding to the $seqID_k$ value.

2. The terminal of claim 1, wherein the respective randomization is a mutually independent randomization over a plurality of successive intervals such that in any block of successive intervals, a communication channel is included at most once.

3. The terminal of claim 1, wherein the respective randomization is such that a communication channel to be used in a last interval in a block of successive intervals is not to be used in a first interval in a next successive block.

4. The terminal of claim 1, wherein the terminal is a BLUETOOTH device.

5. A method of generating a randomized channel sequence for a transmitter, comprising:
identifying, in the transmitter, a plurality of communication channels to be used in the sequence, wherein the sequence includes a succession of intervals with each interval having a respective communication channel to be used during the interval; and
randomizing, in the transmitter, the channels to be used in the channel sequence by:
(a) randomly or pseudo-randomly independently determining the respective communication channel to be used in each interval; or
(b) dividing the succession of intervals into successive blocks that each include a plurality of successive intervals and randomly or pseudo-randomly determining the channels to be used in each block, with each channel in a block to be used only once in that block and each block independent of the other blocks; or
(c) dividing the succession of intervals into successive blocks that each include a plurality of successive intervals and randomly or pseudo-randomly determining the channels to be used in each block, with each channel in a block to be used only once in that block and with different channels to be used in adjacent intervals in adjacent blocks;

wherein step (c) includes computing, for each successive block k, a seqID$_k$ value according to:

$$seqID_k = mod(baseSeqID_{k-1} + rand\{0, \ldots, (n-1) \cdot (n-1)! - 1\}_k, n!)$$

in which n is a total number of channels, mod (.,.) represents a modulo function, rand{.} represents a randomization function, .! represents factorial, baseSeqID$_{k-1}$ is a completeness parameter, the channels are respectively numbered 1, 2, . . . , n, and seqID$_0$=rand{0, . . . , n!−1}; and retrieving for each successive block k a stored channel sequence corresponding to the seqID$_k$ value.

6. The method of claim 5, wherein step (b) includes generating a random or pseudo-random integer for a respective block as an index in a table of predetermined block channel sequences, and retrieving a stored block channel sequence corresponding to the index.

7. A non-transitory computer-readable medium having stored instructions that, when executed by a computer, cause the computer to carry out a method of generating a randomized channel sequence for a transmitter, wherein the method comprises:
   identifying a plurality of communication channels to be used in the sequence, wherein the sequence includes a succession of intervals with each interval having a respective communication channel to be used during the interval; and
   randomizing the channels to be used in the channel sequence by:
   (a) randomly or pseudo-randomly independently determining the respective communication channel to be used in each interval; or
   (b) dividing the intervals into successive blocks that each include a plurality of successive intervals and randomly or pseudo-randomly determining the channels to be used in each block, with each channel in a block to be used only once in that block and each block independent of the other blocks; or
   (c) dividing the intervals into successive blocks that each include a plurality of successive intervals and randomly or pseudo-randomly determining the channels to be used in each block, with each channel in a block to be used only once in that block and with different channels to be used in adjacent intervals in adjacent blocks;

wherein step (c) includes computing, for each successive block k, a seqID$_k$ value according to:

$$seqID_k = mod(baseSeqID_{k-1} + rand\{0, \ldots, (n-1) \cdot (n-1)! - 1\}_k, n!)$$

in which n is a total number of channels, mod (.,.) represents a modulo function, rand{.} represents a randomization function, .! represents factorial, baseSeqID$_{k-1}$ is a completeness parameter, the channels are respectively numbered 1, 2, . . . , n, and seqID$_0$=rand{0, . . . , n!−1}; and retrieving for each successive block k a stored channel sequence corresponding to the seqID$_k$ value.

8. The non-transitory computer-readable medium of claim 7, wherein step (b) includes generating a random or pseudo-random integer for a respective block as an index in a table of predetermined block channel sequences, and retrieving a stored block channel sequence corresponding to the index.

* * * * *